United States Patent
Iwamura

(10) Patent No.: US 8,385,920 B2
(45) Date of Patent: Feb. 26, 2013

(54) MOBILE STATION AND MOBILE COMMUNICATION METHOD

(75) Inventor: Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 214 days.

(21) Appl. No.: 12/744,228

(22) PCT Filed: Nov. 20, 2008

(86) PCT No.: PCT/JP2008/071109
§ 371 (c)(1),
(2), (4) Date: Jun. 30, 2010

(87) PCT Pub. No.: WO2009/066726
PCT Pub. Date: May 28, 2009

(65) Prior Publication Data
US 2010/0285806 A1 Nov. 11, 2010

(30) Foreign Application Priority Data

Nov. 21, 2007 (JP) ................. P2007-302278
Sep. 22, 2008 (JP) ................. P2008-243402

(51) Int. Cl.
*H04W 36/00* (2009.01)
(52) U.S. Cl. .......... 455/437; 455/436; 455/422.1; 370/331
(58) Field of Classification Search ........ 455/437, 455/436, 450, 423, 442, 517; 370/328–338
See application file for complete search history.

(56) References Cited

U.S. PATENT DOCUMENTS

| 6,445,917 B1 * | 9/2002 | Bark et al. ............. 455/423 |
| 2006/0052104 A1 | 3/2006 | Kono |
| 2008/0311900 A1 * | 12/2008 | Pica et al. ............. 455/423 |

FOREIGN PATENT DOCUMENTS

| JP | 11-122672 A | 4/1999 |
| JP | 2003-500909 A | 1/2003 |
| JP | 2004-228705 A | 8/2004 |
| JP | 2005-051416 A | 2/2005 |

(Continued)

OTHER PUBLICATIONS

3GPP TS 36.300 V8.2.0, Sep. 2007, Evolved Universal Terrestrial Radio Access (E-UTRA) and Evolved Universal Terrestrial Radio Access Network (E-UTRAN), 109 pages.

(Continued)

*Primary Examiner* — Chuong A Ngo
(74) *Attorney, Agent, or Firm* — Osha Liang LLP

(57) ABSTRACT

"A mobile station that includes a measurement information storage unit configured to store a measurement rule and a measurement object in association with each other; a measurement unit to perform a measurement of a radio quality in an inter-frequency cell using a frequency defined by the measurement object stored in the measurement information storage unit; a measurement report transmitter unit configured to transmit a measurement report to a radio base station, when determining that a determination condition defined by the measurement rule associated with the measurement object is satisfied on the basis of the measurement result of the radio quality; and a handover processor unit configured to perform an inter-frequency handover in response to an instruction from the radio base station. The measurement information storage unit is configured to change the association between the measurement rule and the measurement object, when the inter-frequency handover is performed."

4 Claims, 10 Drawing Sheets

FOREIGN PATENT DOCUMENTS

JP  2006-262178 A  9/2006

OTHER PUBLICATIONS

3GPP TS 25.331 v7.6.0, Sep. 2007, "Radio Resource Control (RRC)," 1460 pages.

International Search Report issued in PCT/JP2008/071109, mailed on Jan. 27, 2009, with translation, 5 pages.

Written Opinion issued in PCT/JP2008/071109, mailed on Jan. 27, 2009, 3 pages.

Office Action for Mexican Patent Application No. MX/a/2010/005570 dated Nov. 27, 2011, with English translation thereof (5 pages).

Hungarian Office Action for Application No. 201003517-8, mailed on May 3, 2011 (7 pages).

* cited by examiner

FIG. 3

| Measurement Rule-ID | Event-TYPE | PARAMETER |
|---|---|---|
| #1 | B1 | |
| #2 | B2 | |
| #3 | B2 | |
| #4 | B3 | |
| : | : | : |

FIG. 4

| | RAT | FREQUENCY | PRIORITY | Measurement Rule-ID |
|---|---|---|---|---|
| | LTE | f1 | 1 | #1 |
| | LTE | f2 | 2 | #2, #3 |
| ☆ | LTE | f3 | 2 | − |
| | UTRAN | f4 | 3 | #4 |
| | UTRAN | f5 | 4 | #4 |
| | GERAN | f6 | 5 | #4 |

FIG. 7

| RAT | FREQUENCY | PRIORITY | Measurement Rule-ID |
|---|---|---|---|
| LTE | f1 | 1 | #1→— |
| LTE | f2 | 2 | #2, #3→#4 |
| LTE | f3 | 2 | —→#4 |
| UTRAN | f4 | 3 | #4 |
| UTRAN | f5 | 4 | #4 |
| GERAN | f6 | 5 | #4 |

FIG. 8

| RAT | FREQUENCY | PRIORITY | Measurement Rule-ID |
|---|---|---|---|
| LTE | f1 | 1 | #1 |
| LTE | f2 | 2 | #2, #3→— |
| LTE | f3 | 2 | —→#2, #3 |
| UTRAN | f4 | 3 | #4 |
| UTRAN | f5 | 4 | #4 |
| GERAN | f6 | 5 | #4 |

| RAT | FREQUENCY | PRIORITY | Measurement Rule-ID |
|---|---|---|---|
| LTE | f1 | 1 | #1 |
| LTE | f2 | 2 | #2,#3→#1 |
| LTE | f3 | 2 | —→#1 |
| UTRAN | f4 | 3 | #4→— |
| UTRAN | f5 | 4 | #4 |
| GERAN | f6 | 5 | #4 |

| RAT | FREQUENCY | PRIORITY | Measurement Rule-ID |
|---|---|---|---|
| LTE | f1 | 1 | #1 |
| LTE | f2 | 2 | #2,#3→#1 |
| LTE | f3 | 2 | —→#1 |
| UTRAN | f4 | 3 | #4→#1 |
| UTRAN | f5 | 4 | #4→— |
| GERAN | f6 | 5 | #4 |

| RAT | FREQUENCY | PRIORITY | Measurement Rule-ID |
|---|---|---|---|
| LTE | f1 | 1 | #1 |
| LTE | f2 | 2 | #2,#3→#1 |
| LTE | f3 | 2 | —→#1 |
| UTRAN | f4 | 3 | #4→#1 |
| UTRAN | f5 | 4 | #4→#1 |
| GERAN | f6 | 5 | #4→— |

FIG. 15

```
-- ASN1START

RRCConnectionReconfiguration ::=    SEQUENCE {
    rrc-TransactionIdentifier           RRC-TransactionIdentifier,
    criticalExtensions                  CHOICE {
        c1                              CHOICE {
            rrcConnectionReconfiguration-rs    RRCConnectionReconfiguration-rs-IEs,
            spare7 NULL,
            spare6 NULL, spare5 NULL, spare4 NULL,
            spare3 NULL, spare2 NULL, spare1 NULL
        },
        criticalExtensions              SEQUENCE {}
    }
}

RRCConnectionReconfiguration-rs-IEs ::= SEQUENCE {
    measurementConfiguration        MeasurementConfiguration        OPTIONAL,   -- Need OC
    mobilityControlInformation      MobilityControlInformation      OPTIONAL,   -- Need OP
    nas-DedicatedInformation        Nas-DedicatedInformation        OPTIONAL,   -- Cond nonHO
    radioResourceConfiguration      RadioResourceConfigDedicated    OPTIONAL,   -- Need OC
    securityConfiguration           SecurityConfiguration           OPTIONAL,   -- Cond Handover
    ue-RelatedInformation           UE-RelatedInformation           OPTIONAL,   -- Need OC
    nonCriticalExtension            SEQUENCE {}                     OPTIONAL
}

-- ASN1STOP
```

MOBILE STATION AND MOBILE COMMUNICATION METHOD

TECHNICAL FIELD

The present invention relates to a mobile station and a mobile communication method.

BACKGROUND ART

Heretofore, there has been provided a mobile communication system that allows an inter-frequency handover for a mobile station UE in a communication environment including a mixture of multiple cells (frequency cells) using different frequencies.

Specifically, a mobile communication system based on the "LTE (Long Term Evolution)" system specified in the 3GPP employs the following configuration. A mobile station UE measures a radio quality in a cell (inter-frequency cell) neighboring a frequency cell that is currently in communication with the mobile station UE. Then, when determining, with reference to a determination condition, that the measured radio quality satisfies a predetermined radio quality, the mobile station UE transmits a measurement report (Measurement Report) indicating the measurement result to a radio base station eNB. Subsequently, the radio base station eNB determines, in accordance with the received measurement report, that an inter-frequency handover for the mobile station UE should be performed from the frequency cell currently in communication with the mobile station UE to an inter-frequency cell having a better radio quality.

Here, the mobile communication system based on the LTE system not only needs to co-exist with a mobile communication system based on another system that has been already deployed such as a UTRAN (UMTS Terrestrial Radio Access Network) system and a GERAN (GSM EDGE Radio Access Network) system, but also needs to support mobility to and from these mobile communication systems.

Note that, the service to be provided, the transmission rate, the radio efficiency and the like differ among the different mobile communication systems, so that the mobile communication system optimum for the communications differs depending on the terms and conditions or the used service of the user.

In addition, the mobile communication system based on the LTE system supports various bandwidths from 1.4 MHz to 20 MHz. Accordingly, when multiple LTE carriers (frequencies) having different bandwidths exist, the optimum frequency differs depending on the used service.

For example, a broadband carrier (frequency) is preferable in a service where a large amount of data is to be downloaded instantly. However, a broadband carrier (frequency) does not necessarily have to be used in a service such as a voice service or machine-to-machine communications.

In addition, it is preferable to flexibly switch between mobile communication systems (RATs) or between carriers (frequencies) in accordance with the degrees of congestions in the RATs or the frequencies.

Accordingly, there is required a method capable of flexibly switching between the RATs or frequencies in accordance with the terms and conditions or the used service of the user, or the degrees of congestions. In particular, there is required a control method with which a priority level can be designated for each RAT or each frequency.

However, the conventional mobile communication system has a problem that the aforementioned determination condition cannot be flexibly changed between multiple mobile communication systems (RATs) or carriers (frequencies) in accordance with their priorities.

In this respect, the present invention has been made in view of the aforementioned problem, and an object of the invention is to provide a mobile station and a mobile communication method capable of flexibly changing a determination condition for determining whether or not to transmit a measurement report by a mobile station UE.

DISCLOSURE OF THE INVENTION

A first aspect of the present invention is summarized as a mobile station including: a measurement information storage unit configured to store a measurement rule and a measurement object in association with each other; a measurement unit configured to perform a measurement of a radio quality in an inter-frequency cell using a frequency defined by the measurement object stored in the measurement information storage unit; a measurement report transmitter unit configured to transmit a measurement report to a radio base station, when determining that a determination condition defined by the measurement rule associated with the measurement object is satisfied on the basis of the measurement result of the radio quality; and a handover processor unit configured to perform an inter-frequency handover in response to an instruction from the radio base station, wherein the measurement information storage unit is configured to change the association between the measurement rule and the measurement object, when the inter-frequency handover is performed.

In the first aspect, the measurement object can be configured to define a frequency used in each inter-frequency cell and a priority of the frequency; and the measurement information storage unit can be configured to change the association between the measurement rule and the measurement object in accordance with the priority of the frequency defined by the measurement object, when the inter-frequency handover is performed.

In the first aspect, the measurement unit can be configured to perform, as the measurement of the radio quality in the inter-frequency cell, any one of a first measurement to measure a radio quality in an inter-frequency cell using a frequency having a priority higher than that of a cell currently in communication, a second measurement to measure a radio quality in an inter-frequency cell using a frequency having the same priority as that of the cell currently in communication, and a third measurement to measure a radio quality in an inter-frequency cell using a frequency having a priority lower than that of the cell currently in communication.

In the first aspect, a first determination condition for determining whether or not to transmit a measurement report on the basis of the radio quality measured by the first measurement, a second determination condition for determining whether or not to transmit a measurement report on the basis of the radio quality measured by the second measurement, and a third determination condition for determining whether or not to transmit a measurement report on the basis of the radio quality measured by the third measurement can be different from each other.

A second aspect of the present invention is summarized as a mobile communication method including the steps of: (A) transmitting, from a radio base station to a mobile station configured to store a measurement rule and a measurement object in association with each other, a measurement rule specifying command that specifies addition or deletion of the measurement rule, and a measurement object specifying command that specifies addition or deletion of the measurement object; (B) measuring, at the mobile station, a radio quality in an inter-frequency cell using a frequency defined by the stored measurement object; (C) transmitting, from the mobile station to the radio base station, a measurement report, when the mobile station determines that a determination condition defined by the measurement rule associated with the measurement object is satisfied on the basis of the measurement result of the radio quality; (D) determining, at the radio base station, whether or not the mobile station is to perform an inter-frequency handover on the basis of the measurement report; and (E) changing, at the mobile station, the association between the measurement rule and the measurement object, when the mobile station performs the inter-frequency handover in response to an instruction from the radio base station.

In the second aspect, the measurement object can define a frequency used in each inter-frequency cell and a priority of the frequency, and in the step (E), the mobile station can change the association between the measurement rule and the measurement object in accordance with the priority of the frequency defined by the measurement object, when the inter-frequency handover is performed.

In the second aspect, in the step (B), the mobile station can perform, as the measurement of the radio quality in the inter-frequency cell, any one of a first measurement to measure a radio quality in an inter-frequency cell using a frequency having a priority higher than that of a cell currently in communication, a second measurement to measure a radio quality in an inter-frequency cell using a frequency having the same priority as that of the cell currently in communication, and a third measurement to measure a radio quality in an inter-frequency cell using a frequency having a priority lower than that of the cell currently in communication.

In the second aspect, a first determination condition for determining whether or not to transmit a measurement report on the basis of the radio quality measured by the first measurement, a second determination condition for determining whether or not to transmit a measurement report on the basis of the radio quality measured by the second measurement, and a third determination condition for determining whether or not to transmit a measurement report on the basis of the radio quality measured by the third measurement can be different.

In the first aspect, the measurement information storage unit can be configured to store the measurement rule and the measurement object in association with each other, by storing identification information of the measurement rule, identification information of the measurement object and association information between the identification information of the measurement rule and the identification information of the measurement object; and the measurement information storage unit can be configured to swap identification information of a first measurement object corresponding to a cell currently in communication, with identification information of a second measurement object corresponding to a handover destination cell, when the inter-frequency handover is performed.

In the first aspect, the measurement information storage unit can be configured to store the measurement rule and the measurement object in association with each other, by storing identification information of the measurement rule, identification information of the measurement object and association information between the identification information of the measurement rule and the identification information of the measurement object; and the measurement information storage unit can be configured to swap identification information of a first measurement object in first association information, with identification information of a second measurement object in second association information, the first association information associating identification information of a first measurement rule with the identification information of the first measurement object corresponding to a cell currently in communication, the second association information associating identification information of a second measurement rule with the identification information of the second measurement object corresponding to a handover destination cell, when the inter-frequency handover is performed.

In the first aspect, when the inter-frequency handover is performed and when the identification information of the second measurement object corresponding to the handover destination cell is not stored in the measurement information storage unit, the measurement information storage unit can be configured to delete the second association information associating the identification information of the second measurement object with the identification information of the second measurement rule.

In the first aspect, the measurement information storage unit can be configured to change a storage content in the measurement information storage unit after performing the swapping, when the instruction from the radio base station instructs a change in the storage content in the measurement information storage unit in addition to the execution of the inter-frequency handover.

In the second aspect, the mobile station can store the measurement rule and the measurement object in association with each other, by storing identification information of the measurement rule, identification information of the measurement object and association information between the identification information of the measurement rule and the identification information of the measurement object; and in the step (E), the mobile station can swap identification information of a first measurement object corresponding to a cell currently in communication with identification information of a second measurement object corresponding to a handover destination cell, when the inter-frequency handover is performed, In the second aspect, the mobile station can store the measurement rule and the measurement object in association with each other, by storing identification information of the measurement rule, identification information of the measurement object and association information between the identification information of the measurement rule and the identification information of the measurement object; and in the step (E), when the inter-frequency handover is performed, the mobile station can swap identification information of a first measurement object in first association information with identification information of a second measurement object in second association information, the first association information associating identification information of a first measurement rule with the identification information of the first measurement object corresponding to a cell currently in communication, the second association information associating identification information of a second measurement rule with the identification information of the second measurement object corresponding to a handover destination cell.

In the second aspect, in the step (E), when the inter-frequency handover is performed and when the identification information of the second measurement object corresponding to the handover destination cell is not stored in the mobile station, the mobile station can delete the second association information associating the identification information of the second measurement object with the identification information of the second measurement rule.

In the second aspect, in the step (E), the mobile station can change a storage content in the mobile station after performing the swapping, when the instruction from the radio base

BRIEF DESCRIPTION OF THE DRAWINGS

FIG. 3 is a diagram showing examples of Measurement Rules stored in the mobile station according to the first embodiment of the present invention.

FIG. 4 is a diagram showing examples of Measurement Objects stored in the mobile station according to the first embodiment of the present invention.

FIG. 7 is a diagram showing an aspect where mapping between Measurement Rules and Measurement Objects stored in the mobile station changes according to the first embodiment of the present invention.

FIG. 8 is a diagram showing an aspect where mapping between Measurement Rules and Measurement Objects stored in the mobile station changes according to the first embodiment of the present invention.

FIG. 15 is a diagram for describing the mobile communication system according to Modification Example 1 of the present invention.

BEST MODE FOR CARRYING OUT THE INVENTION

Configuration of Mobile Communication System According to First Embodiment of the Present Invention A description will be given of a configuration of a mobile communication system according to a first embodiment of the present invention, with reference to FIGS. 1 through 5.

Figure 1:
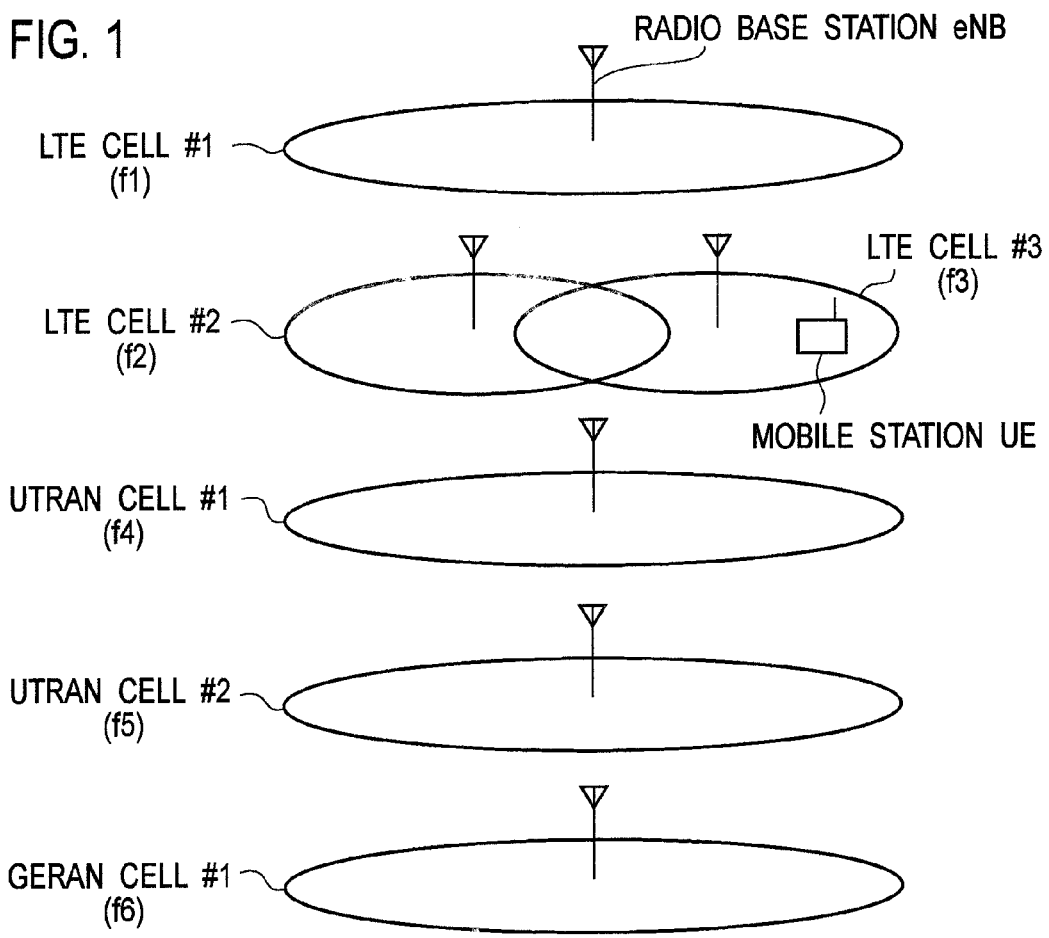
FIG. 1 is an overall configuration diagram of a mobile communication system according to a first embodiment of the present invention.

As shown in FIG. 1, the mobile communication system according to the first embodiment includes a mixture of the following cells: an LTE cell #1, which is a cell of an LTE mobile communication system using a frequency f1; an LTE cell #2, which is a cell of an LTE mobile communication system using a frequency f2; an LTE cell #3, which is a cell of an LTE mobile communication system using a frequency f3; a UTRAN cell #1, which is a cell of a UTRAN mobile communication system using a frequency f4; a UTRAN cell #2, which is a cell of a UTRAN mobile communication system using a frequency f5; and a GERAN cell #1, which is a cell of a GERAN mobile communication system using a frequency (band) f6.

In the example shown in FIG. 1, a mobile station UE is in communication with the LTE cell #3 and is assumed to be capable of measuring radio qualities in the LTE cell #1, the LTE cell #2, the UTRAN cell #1, the UTRAN cell #2 and the GERAN cell #1.

Figure 2:
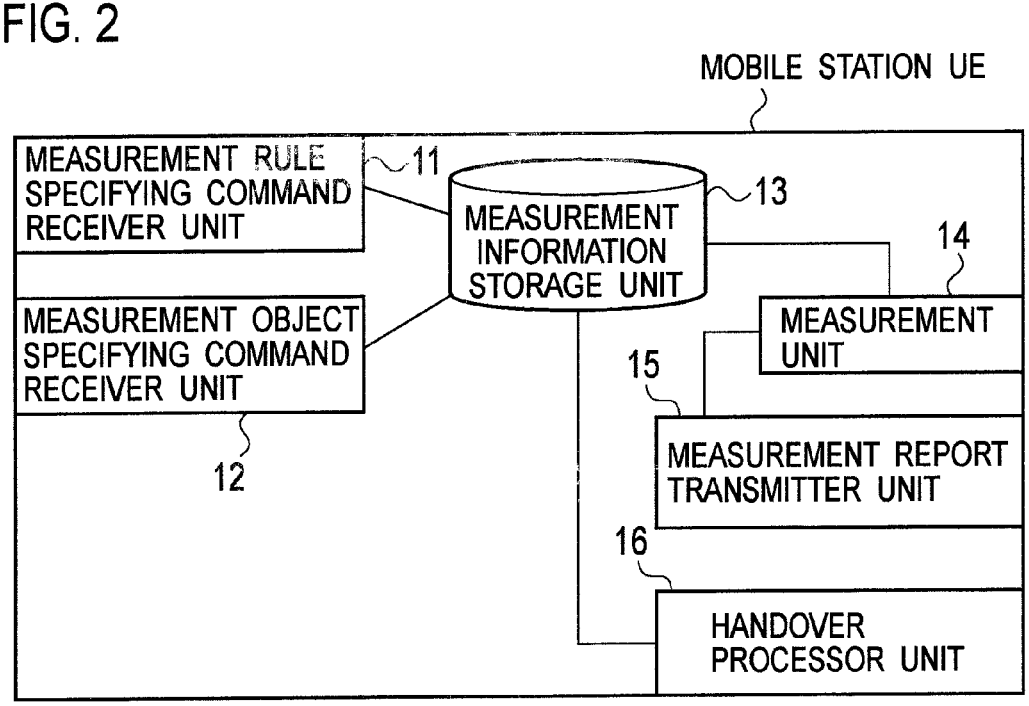
FIG. 2 is a functional block diagram of a mobile station according to the first embodiment of the present invention.

As shown in FIG. 2, the mobile station UE according to this embodiment includes a Measurement Rule specifying command receiver unit 11, a Measurement Object specifying command receiver unit 12, a measurement information storage unit 13, a measurement unit 14, a Measurement Report transmitter unit 15 and a handover processor unit 16.

The Measurement Rule specifying command receiver unit 11 is configured to receive a Measurement Rule specifying command (measurement rule specifying command) transmitted from a radio base station eNB via a broadcast signal or a dedicated signal, and to perform addition or deletion of a "Measurement Rule (measurement rule)" in the measurement information storage unit 13.

The Measurement Rule (or may be called "Reporting Configuration") defines a determination condition for determining, for the mobile station UE, whether or not to transmit a Measurement Report, on the basis of a measurement result of a radio quality in an inter-frequency cell using a frequency different from that of the cell currently in communication with the mobile station UE.

Specifically, the aforementioned Measurement Rule is identified by a "Measurement Rule-ID" and defines the determination condition specified by an "Event-Type" and a "parameter" (refer to FIG. 3).

Here, the "Measurement Rule-ID" is information for identifying the determination condition to be defined by the "Measurement Rule".

The "Event-type" is information indicating that the determination condition defined by the "Measurement Rule" is applicable to which one of later described first to third determination conditions.

Here, the first determination condition is a determination condition for determining, on the basis of the radio quality measured by a first measurement, whether or not to transmit a Measurement Report. The second determination condition is a determination condition for determining, on the basis of the radio quality measured by a second measurement, whether or not to transmit a Measurement Report. The third determination condition is a determination condition for determining, on the basis of the radio quality measured by a third measurement, whether or not to transmit a Measurement Report.

In addition, the first measurement is a measurement to measure a radio quality in an inter-frequency cell using a frequency having a higher priority than that of the cell currently in communication with the mobile station UE. The second measurement is a measurement to measure a radio quality in an inter-frequency cell using a frequency having the same priority as that of the cell currently in communication with the mobile station UE. The third measurement is a measurement to mainly measure a radio quality in an inter-frequency cell using a frequency having a lower priority than that of the cell currently in communication with the mobile station UE.

For example, the first determination condition is defined on the basis of the condition expression shown below (Expression 1).

(Radio Quality in Measurement Target Cell)>(Predetermined Threshold $Th1$)      (Expression 1)

In addition, the second determination condition is defined on the basis of the condition expression shown below (Expression 2).

(Radio Quality in Measurement Target Cell)+(Predetermined Offset Value)>(Radio Quality in Cell That Is Currently in Communication)      (Expression 2)

Further, the third determination condition is defined on the basis of the condition expression shown below (Expression 3).

(Radio Quality in Cell That Is Currently in Communication)<(Predetermined Threshold $Th2$), and (Radio Quality in Measurement Target Cell)>(Predetermined Threshold $Th3$)      (Expression 3)

The "parameter" includes parameters such as the aforementioned thresholds Th1 to Th3, the predetermined offset value and the like.

In addition, in the aforementioned determination conditions, a cell unique correction value may be taken into account with respect to the measurement result of the radio quality in the measurement object cell or the cell that is currently in communication. Such a correction value is used to make a transition to a Specific cell easy or to make a transition to a specific cell difficult. The correction value is specified by a broadcast signal or a dedicated signal.

Here, a timing to perform measurement of the aforementioned radio quality ("Time to Trigger"), an interval to transmit a Measurement Report ("Reporting Interval"), the maximum number of transmissions of Measurement Report ("Maximum Number of Reporting") or the like may be included as the aforementioned parameter.

The Measurement Object specifying command receiver unit 12 is configured to receive a Measurement Object specifying command (measurement object specifying command) transmitted from the radio base station eNB via a broadcast signal or a dedicated signal, and then to perform addition or deletion of the "Measurement Object (measurement object)" in the measurement information storage unit 13.

The Measurement Object defines, for each mobile station UE, a frequency whose radio quality is to be measured and a priority of the frequency. Note that, the Measurement Object may be configured to define, for each mobile station UE, only a frequency (including the radio access technique) whose radio quality is to be measured and not to define a priority of the frequency. The measurement information storage unit 13 is configured to store the Measurement Rules and the Measurement Objects in association with each other.

As shown in FIG. 3, the measurement information storage unit 13 is configured to store a Measurement Rule received by the Measurement Rule specifying command receiver unit 11, for example.

In addition, as shown in FIG. 4, the measurement information storage unit 13 is configured to store a Measurement Object received by the Measurement Object specifying command receiver unit 12.

Further, the measurement information storage unit 13 is configured to store the Measurement Rules and the Measurement Objects in association with each other, by setting the "Measurement Rule-IDs" in the table shown in FIG. 3, in the "Measurement Rule-IDs" in the table shown in FIG. 4.

Here, in the example shown in FIG. 4, the table shows that the mobile station UE is currently in communication with the LTE cell #3 using the frequency f3.

Moreover, in the example shown in FIG. 4, the following are defined: whether or not to transmit a Measurement Report is determined on the basis of the radio quality in the LTE cell #1 by use of the determination condition identified by the "Measurement Rule-ID=#1", the LTE cell #1 using the frequency f1; whether or not to transmit a Measurement Report is determined on the basis of the radio quality in the LTE cell #2 by use of the determination conditions identified by the "Measurement Rule-ID=#2 and #3", the LTE cell #2 using the frequency f2; whether or not to transmit a Measurement Report is determined on the basis of the radio quality in the UTRAN cell #1 by use of the determination condition identified by the "Measurement Rule-ID=#4", the UTRAN cell #1 using the frequency f4; whether or not to transmit a Measurement Report is determined on the basis of the radio quality in the UTRAN cell #2 by use of the determination condition identified by the "Measurement Rule-ID=#4", the UTRAN cell #2 using the frequency f5; and whether or not to transmit a Measurement Report is determined on the basis of the radio quality in the GERAN cell #1 by use of the determination condition identified by the "Measurement Rule-ID=#4", the GERAN cell #1 using the frequency (band) f6.

The measurement unit 14 is configured to measure the radio qualities in the inter-frequency cells using the frequencies defined by the Measurement Objects stored in the measurement information storage unit 13.

For example, the measurement unit 14 is configured to measure the radio qualities in all of the inter-frequency cells associated with the Measurement Rules (in other words, all of the inter-frequency cells for which "Measurement Rule-IDs" are set in the table shown in FIG. 4) among the inter-frequency cells using the frequencies defined by the Measurement Objects stored in the measurement information storage unit 13.

The Measurement Report transmitter unit 15 is configured to transmit a Measurement Report to the radio base station eNB, only when the determination condition defined in the Measurement Rule associated with the Measurement Object is determined to be satisfied on the basis of the radio qualities measured by the measurement unit 14.

Specifically, the Measurement Report transmitter unit 15 is configured to use the determination condition defined by the "Measurement Rule-ID", "Event-Type" and "parameter" included in the Measurement Rule stored in the measurement information storage unit 13 as shown in FIG. 3, and then to determine, on the basis of the radio quality in the Measurement Object associated with the Measurement Rule, whether or not to transmit a Measurement Report.

In the example shown in FIG. 4, the Measurement Report transmitter unit 15 is configured to use the determination condition identified by the "Measurement Rule-ID=#1", and then to determine, on the basis of the radio quality in the LTE cell #1, whether or not to transmit a Measurement Report. In addition, the Measurement Report transmitter unit 15 is configured to use the determination condition identified by the "Measurement Rule-ID=#2 and #3", and then to determine, on the basis of the radio quality in the LTE cell #2, whether or not to transmit a Measurement Report. Moreover, the Measurement Report transmitter unit 15 is configured to use the determination condition identified by the "Measurement Rule-ID=#4", and then to determine, on the basis of the radio quality in the UTRAN cell #1, whether or not to transmit a Measurement Report. Furthermore, the Measurement Report transmitter unit 15 is configured to use the determination condition identified by the "Measurement Rule-ID=#4", and then to determine, on the basis of the radio quality in the UTRAN cell #2, whether or not to transmit a Measurement Report. The Measurement Report transmitter unit 15 is also configured to use the determination condition identified by the "Measurement Rule-ID=#4", and then to determine, on the basis of the radio quality in the GERAN cell #1, whether or not to transmit a Measurement Report.

Here, the Measurement Report transmitter unit 15 is configured to make the aforementioned determinations in the descending order of cells using the frequencies having high priorities, and may be configured not to make the aforementioned determinations after transmitting one or a predetermined number of Measurement Reports.

Note that, the Measurement Report transmitter unit 15 is configured to store patterns of the first to third determination conditions shown in (Expressions 1 to 3), then to select any of the patterns of the first to third determination conditions specified by the aforementioned "Event-Type", and then to set the pattern as the determination condition to be used for the aforementioned determination, after a parameter (predetermined threshold or the like) included in the aforementioned "parameter" is substituted for the pattern of the selected determination condition.

For example, in the case shown in FIG. 3, the Measurement Report transmitter unit 15 may be configured to set the pattern of the first determination condition shown in (Expression 1) corresponding to the "Event-Type=B1" to be the determination condition to be used for the aforementioned determination, after the parameter (predetermined threshold Th1) included in the "parameter" associated with the "Event-Type=B1" is substituted for the pattern of the first determination condition.

In addition, the Measurement Report transmitter unit 15 may be configured to set the pattern of the second determination condition shown in (Expression 2) corresponding to the "Event-Type=B2" to be the determination condition to be used for the aforementioned determination, after the parameter (predetermined offset value) included in the "parameter" associated with the "Event-Type=B2" is substituted for the pattern of the second determination condition.

Moreover, the Measurement Report transmitter unit 15 may be configured to set the pattern of the third determination condition shown in (Expression 3) corresponding to the "Event-Type=B3" to be the determination condition to be used for the aforementioned determination, after the parameters (predetermined thresholds Th2 and Th3) included in the "parameter" associated with the "Event-Type=B3" are substituted for the pattern of the third determination condition.

Here, the patterns of the aforementioned determination conditions may be other than the patterns shown in (Expressions 1 to 3) described above.

The handover processor unit 16 is configured to perform an inter-frequency handover in response to an instruction from the radio base station eNB.

Here, the measurement information storage unit 13 is configured to autonomously change the stored association between the measurement rules and the measurement objects, when an inter-frequency handover is performed.

Specifically, the measurement information storage unit 13 is configured to change the stored association between the measurement rules and the measurement objects in accordance with the priorities of the frequencies defined by the measurement objects, when an inter-frequency handover is performed. A specific method of changing the association will be described later with reference to FIGS. 7 through 11.

Figure 5:
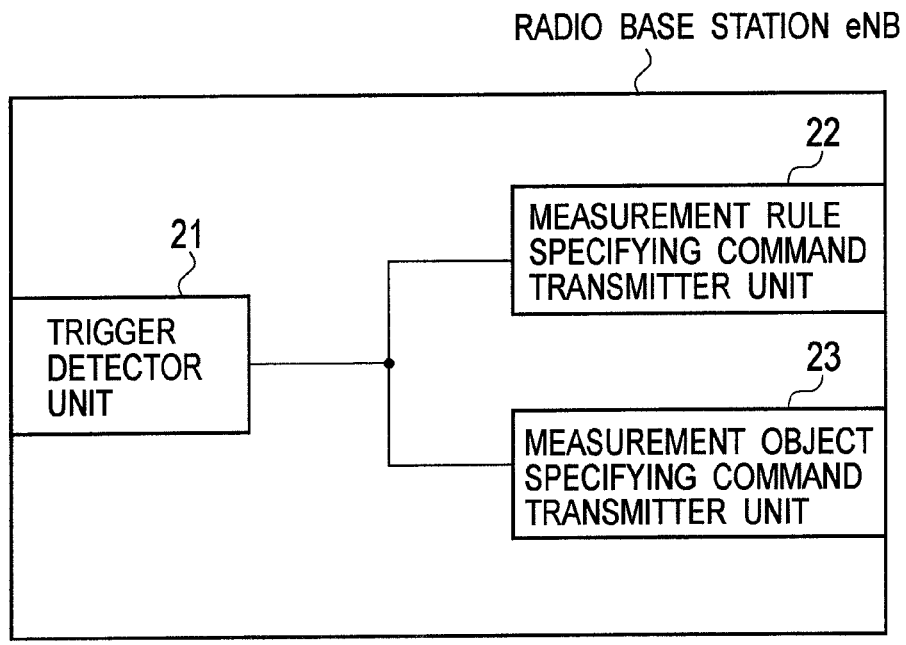
FIG. 5 is a functional block diagram of a radio base station according to the first embodiment of the present invention.

As shown in FIG. 5, the radio base station eNB according to the present embodiment includes a trigger detector unit 21, a Measurement Rule specifying command transmitter unit 22 and a Measurement Object specifying command transmitter unit 23.

The trigger detector unit 21 is configured to detect a trigger to transmit a Measurement Rule specifying command or a Measurement Object specifying command with respect to a specific mobile station UE.

As the aforementioned trigger, the following cases are expected: a specific mobile station UE transitions from an "Idle state" to an "Active state"; a different frequency hand over of a specific mobile station UE is performed; a communication condition between a specific mobile station UE and a cell currently in communication with the specific mobile station UE satisfies a predetermined condition; and the like.

The Measurement Rule specifying command transmitter unit 22 is configured to transmit a Measurement Rule specifying command including the "Measurement Rule-ID", the "Event-Type" and the "parameter", when the trigger detector unit 21 detects a trigger to transmit a Measurement Rule specifying command with respect to a specific mobile station UE.

In addition, the Measurement Rule specifying command transmitter unit 22 is configured to transmit a Measurement Rule specifying command that specifies addition or deletion of a Measurement Rule, to the measurement information storage unit 13 in a specific mobile station UE.

The Measurement Object specifying command transmitter unit 23 is configured to transmit a Measurement Object specifying command separately from the Measurement Rule specifying command, when the trigger detector unit 21 detects a trigger to transmit a Measurement Object specifying command to a specific mobile station, the Measurement Object specifying command including the "RAT", the "frequency" and the "priority".

In addition, the Measurement Object specifying command transmitter unit 23 is configured to transmit a Measurement Rule specifying command that specifies addition or deletion of a Measurement Object, to the measurement information storage unit 13 in a specific mobile station UE.

Here, the Measurement Rule specifying command transmitter unit 22 and the Measurement Object specifying command transmitter unit 23 may be configured to transmit a Measurement Object specifying command and a Mapping specifying command to a specific mobile station UE by use of different signaling (a broadcast signal or a dedicated signal).

In addition, at the time of an inter-frequency handover of a mobile station UE, the Measurement Rule specifying command transmitter unit 22 may transmit, by the command to trigger the handover, a Measurement Rule specifying command for specifying the Measurement Rule to be used in the handover destination cell, and the Measurement Object specifying command transmitter unit 23 may transmit, by the command to trigger the handover, a Measurement Object specifying command for specifying the Measurement Object to be used in the handover destination cell.

(Operation of Mobile Station UE According to First Embodiment of the Present Invention)

An operation of the mobile station UE according to the first embodiment of the invention will be described with reference to FIGS. 6 through 11.

Figure 6:
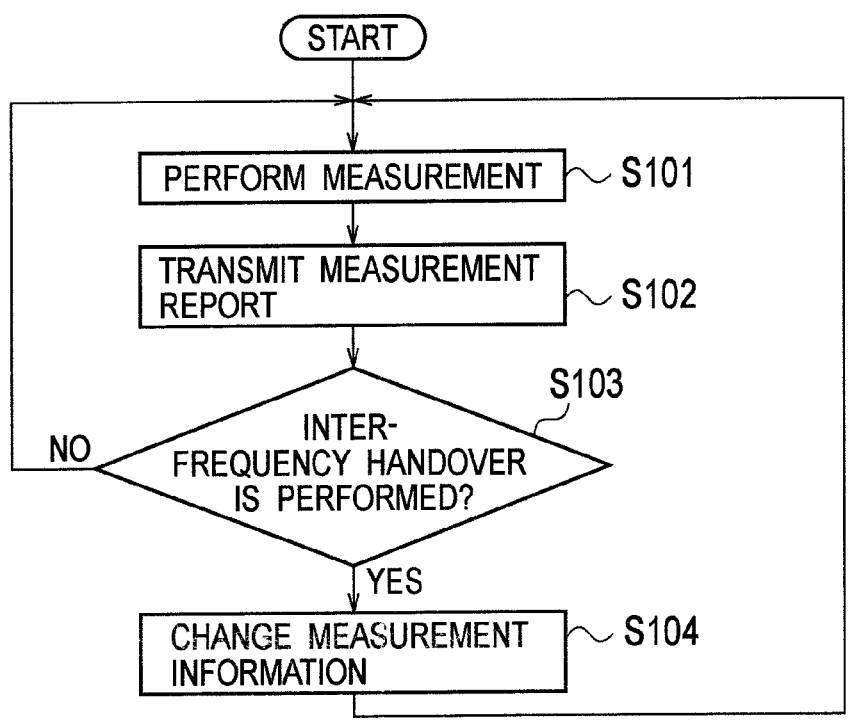
FIG. 6 is a flowchart showing an operation of the mobile station according to the first embodiment of the present invention.

As shown in FIG. 6, in step S101, the measurement unit 14 of the mobile station UE measures, at a predetermined timing, the radio qualities in the inter-frequency cells (frequencies) defined in the Measurement Objects, in accordance with priorities defined in the Measurement Objects stored in the measurement information storage unit 13, In step S102, the Measurement Report transmitter unit 15 determines, on the basis of the radio qualities measured by the measurement unit 14, whether or not the determination condition defined by the Measurement Rule associated with the Measurement Object is satisfied. The Measurement Report transmitter unit 15 then transmits a Measurement Report to the radio base station eNB, only when determining that the determination condition is satisfied.

In step S103, in a case where the handover processor unit 16 performs an inter-frequency handover in response to an instruction from the radio base station eNB, the operation proceeds to step S104, and the operation returns to step S101 except for the aforementioned case.

In step S104, the measurement information storage unit 13 changes the association between the Measurement Rules and the Measurement Objects stored therein.

Hereinafter, an example of the method of changing the aforementioned association will be described with reference to FIGS. 7 through 11. Here, an assumption is made that the association between the Measurement Rules and the Measurement Objects before an inter-frequency handover is the association shown in FIG. 4.

Firstly, an example of a case where the cell in communication with the mobile station UE transitions from the LTE cell #3 (frequency f3) to the LTE cell #1 (frequency f1) due to an inter-frequency handover will be described with reference to FIG. 7.

The priority of the cell (the LTE cell #1) in communication with the mobile station UE becomes "1", i.e., the priority of the cell becomes higher than those of the other inter-frequency cells after the aforementioned inter-frequency handover, so that the measurements of the radio qualities in the other inter-frequency cells are to be performed by the aforementioned "third measurement".

Accordingly, as shown in FIG. 7, the "Measurement Rule-IDs" to be associated with the Measurement Objects corresponding to the LTE cell #2 and the LTE cell #3 are changed to the "#4 (identification information of the third determination condition)".

Secondly, an example of a case where the cell in communication with the mobile station UE transitions from the LTE cell #3 (frequency f3) to the LTE cell #2 (frequency f2) due to an inter-frequency handover will be described with reference to FIG. 8.

The priority of the cell in communication with the mobile station UE remains "2", but the cell in communication with the mobile station UE is changed from the LTE cell #3 to the LTE cell #2 after the inter-frequency handover. Accordingly, as shown in FIG. 8, the LTE cell #2 is set to be the cell that is currently in communication, and the "Measurement Rule-ID" to be associated with the Measurement Object corresponding to the LTE cell #3 is changed to the "#2 and #3 (identification information of the second determination condition)."

Figure 9:
FIG. 9 is a diagram showing an aspect where mapping between Measurement Rules and Measurement Objects stored in the mobile station changes according to the first embodiment of the present invention.

Thirdly, an example of a case where the cell in communication with the mobile station UE transitions from the LTE cell #3 (frequency f3) to the UTRAN cell #1 (frequency f4) due to an inter-frequency handover will be described with reference to FIG. 9.

The priority of the cell (the UTRAN cell #1) in communication with the mobile station UE becomes "3" after the aforementioned inter-frequency handover. Accordingly, as shown in FIG. 9, the UTRAN cell #1 is set to be the cell that is currently in communication, and the "Measurement Rule-IDs" to be associated with the Measurement Objects corresponding to the LTE cell #2 and the LTE cell #3 are changed to the "#1 (identification information of the first determination condition)."

Figure 10:
FIG. 10 is a diagram showing an aspect where mapping between Measurement Rules and Measurement Objects stored in the mobile station changes according to the first embodiment of the present invention.

Fourthly, an example of a case where the cell in communication with the mobile station UE transitions from the LTE cell #3 (frequency f3) to the UTRAN cell #2 (frequency f5) due to an inter-frequency handover will be described with reference to FIG. 10.

The priority of the cell (the UTRAN cell #2) in communication with the mobile station UE becomes "4" after the aforementioned inter-frequency handover. Accordingly, as shown in FIG. 10, the UTRAN cell #2 is set to be the cell that is currently in communication, and the "Measurement Rule-IDs" to be associated with the Measurement Objects corresponding to the LTE cell #2, the LTE cell #3 and the UTRAN cell #1 are changed to the "#1 (identification information of the first determination condition)."

Figure 11:
FIG. 11 is a diagram showing an aspect where mapping between Measurement Rules and Measurement Objects stored in the mobile station changes according to the first embodiment of the present invention.

Fifthly, an example of a case where the cell in communication with the mobile station UE transitions from the LTE cell #3 (frequency f3) to the GERAN cell #1 (frequency f6) due to an inter-frequency handover will be described with reference to FIG. 11.

The priority of the cell (the GERAN cell #1) in communication with the mobile station UE becomes "5" after the aforementioned inter-frequency handover. Accordingly, as shown in FIG. 11, the GERAN cell #1 is set to be the cell that is currently in communication, and the "Measurement Rule-IDs" to be associated with the Measurement Objects corresponding to the LTE cell #2, the LTE cell #3, the UTRAN cell #1 and the UTRAN cell #2 are changed to the "#1 (identification information of the first determination condition)".

(Advantageous Effects of Mobile Communication System According to First Embodiment of the Present Invention)

With the mobile communication system according to the present embodiment, the mobile station UE is configured to autonomously change the association between the measurement rules defining the measurement conditions and the measurement objects defining the frequencies and the priorities after the inter-frequency handover, so that the signaling along with the handover can be reduced, and the determination condition for the mobile station UE to determine whether or not to transmit a Measurement Report can be flexibly changed to another.

Modification Example 1

Hereinafter, with reference to FIGS. 12 through 19, a mobile communication system according to Modification Example 1 of the present invention will be described focusing on a difference from the aforementioned mobile communication system according to the first embodiment.

Figure 12:
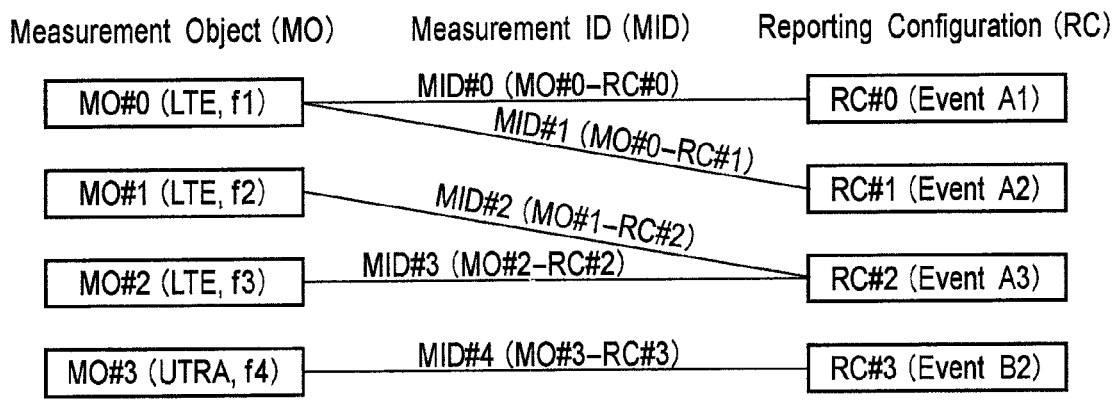
FIG. 12 is a diagram for describing a mobile communication system according to Modification Example 1 of the present invention.

In Modification Example 1, as shown in FIG. 12, the measurement information storage unit 13 is configured to store the measurement rules and the measurement objects in association with each other, by storing identification information of the measurement rules (Measurement Rule, i.e., Reporting Configurations (RC)), identification information of measurement objects (Measurement Objects (MO)) and association information (Measurement-ID (MID)) of the identification information of the measurement rules and the identification information of the measurement objects.

In the example shown in FIG. 12, the measurement information storage unit 13 stores therein the following information: association information (MID #0) associating the identification information (MO #0) of the measurement object (LTE/f1) with the identification information (RC #0) of the measurement rule (Event A1); association information (MID #1) associating the identification information (MO #0) of the measurement object (LTE/f1) with the identification information (RC #1) of the measurement rule (Event A2); association information (MID #2) associating the identification information (MO #1) of the measurement object (LTE/f2) with the identification information (RC #2) of the measurement rule (Event A3); association information (MID #3) associating the identification information (MO #2) of the measurement object (LTE/f3) with the identification information (RC #2) of the measurement rule (Event A3); and association information (MID #4) associating the identification information (MO #3) of the measurement object (UTRA/f4) with the identification information (RC #3) of the measurement rule (Event B2).

The measurement information storage unit 13 may be configured to manage the measurement rules, the measurement objects and the association information separately, and thus to be capable of performing addition, modification or deletion of the contents of the measurement rules, the measurement objects and the association information separately. Here, the measurement unit 14 may be configured to perform the aforementioned measurements for the measurement objects set in the association information.

In addition, the measurement information storage unit 13 may be configured to delete the association information (MID #0/MID #1) when deleting a specific measurement object (MO #0) or a specific measurement rule (RC #0), the association information (MID #0/MID #1) including the specific measurement object (MO #0) or the specific measurement rule (RC #0). Here, a measurement object and a measurement rule do not always need to be included in any association information.

Moreover, in the case of performing an inter-frequency handover, the measurement information storage unit 13 may be configured to swap the identification information of the first measurement object corresponding to the cell currently in communication, with the identification information of the second measurement object corresponding to the cell of the handover destination.

Figure 13:
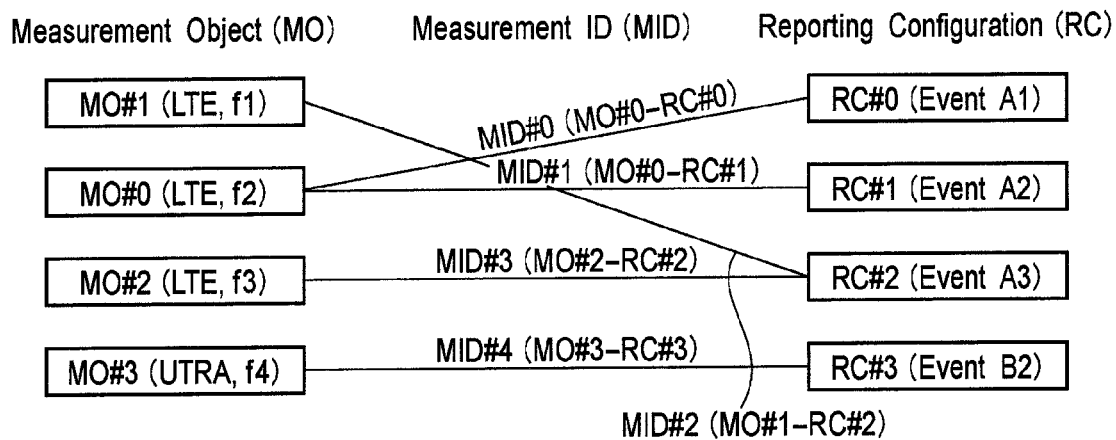
FIG. 13 is a diagram for describing the mobile communication system according Modification Example 1 of the present invention.

For example, in the case of performing an inter-frequency handover, the storage contents of the measurement information storage unit 13 transition from the state shown in FIG. 12 to the state shown in FIG. 13. Specifically, in the case of performing an inter-frequency handover, the measurement information storage unit 13 swaps the identification information (MO #0) of the first measurement object (LTE/f1) corresponding to the cell currently in communication, with the identification information (MO #1) of the second measurement object (LTE/f2) corresponding to the cell of the handover destination. Thereby, the identification information of the second measurement object (LTE/f2) corresponding to the cell of the handover destination becomes "MO #0", and the identification information of the first measurement object (LTE/f1) corresponding to the cell currently in communication becomes "MO #1". Here, no change is made in the MID.

Alternatively, in the case of performing an inter-frequency handover, the measurement information storage unit 13 may be configured to swap the identification information of the first measurement object in first association information, with the identification information of the second measurement object in second association information. Here, the first association information associates the identification information of the first measurement object corresponding to the cell currently in communication, with the identification information of the first measurement rule, while the second association information associates the second measurement object corresponding to the cell of the handover destination, with the identification information of the second measurement rule.

Figure 14:
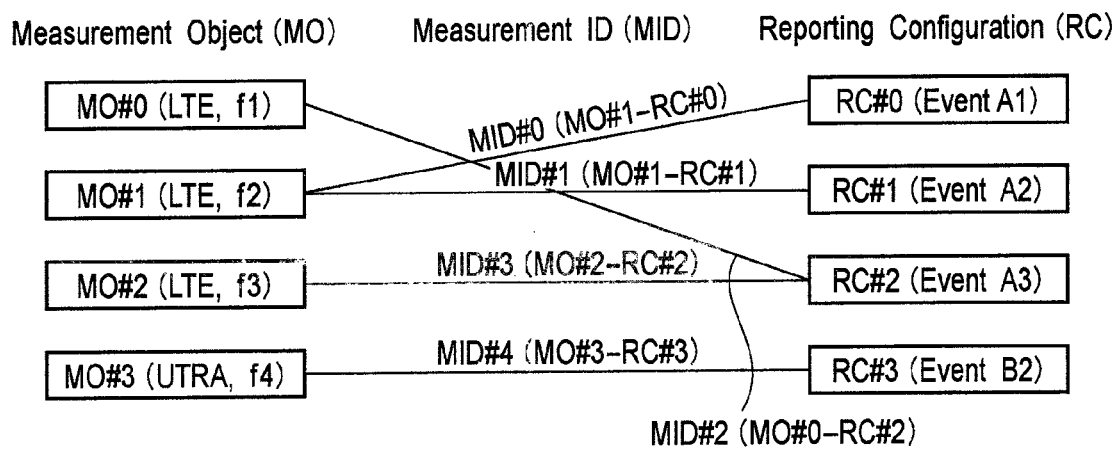
FIG. 14 is a diagram for describing the mobile communication system according to Modification Example 1 of the present invention.

For example, in the case of performing an inter-frequency handover, the storage contents of the measurement information storage unit 13 transition from the state shown in FIG. 12 to the state shown in FIG. 14. Specifically, in the case of performing an inter-frequency handover, the measurement information storage unit 13 may be configured to swap the identification information (MO #0) of the first measurement object (LTE/f1) in the first association information (MID #0/MID #1), with the identification information (MO #1) of the second measurement object (LTE/f2) in the second association information (MID #2). Here, the first association information (MID #0/MID #1) associates the identification information (MO #0) of the first measurement object (LTE/f1) corresponding to the cell currently in communication, with the identification information (RC #0) of the first measurement rule (Event A1/Event A2), while the second association information (MID #2) associates the identification information (MO #1) of the second measurement object (LTE/f2) corresponding to the cell of the handover destination, with the identification information (RC #2) of the second measurement rule (Event A3).

As a result, no change is made in the identification information of the measurement objects and the identification information of the measurement rules, but the association contents of the identification information of the measurement objects and the identification information of the measurement rules are changed in the association information.

Note that, in the case of performing an inter-frequency handover, the measurement information storage unit 13 may be configured to delete the second association information, when not storing the identification information of the second measurement object corresponding to the cell of the handover destination. Here, the second association information associates the identification information of the second measurement object with the identification information of the second measurement rule.

The handover processor unit 16 is configured to perform the aforementioned inter-frequency handover in a case where: "RRC Connection Reconfiguration" shown in FIG. 15 is received from the radio base station eNB; "mobilityControlInformation" is included in the "RRC Connection Reconfiguration;" and a cell using a frequency different from that of the cell currently in communication is specified as the handover destination in the "mobilityControlInformation".

Moreover, when "measurementConfiguration" is included in the "RRC Connection Reconfiguration", the measurement information storage unit 13 is configured to change the storage contents in accordance with the "measurementConfiguration".

Specifically, the measurement information storage unit 13 is configured to perform addition, change, or deletion of the measurement object, the measurement rule, or the association information between the measurement object and the measurement rule as specified by the "measurementConfiguration".

In this case, specifically, the measurement information storage unit 13 may be configured to perform the aforementioned swapping first, and then makes a change with respect to the measurement information storage unit 13, when the instruction ("RRC Connection Reconfiguration") from the radio base station eNB instructs to perform a change with respect to the storage contents of the measurement information storage unit 13 ("measurementConfiguration" specifying addition, change or deletion of the measurement object, the measurement rule or the association information between the measurement object and the measurement rule) in addition to performing the inter-frequency handover ("mobilityControlInformation").

Figure 16:
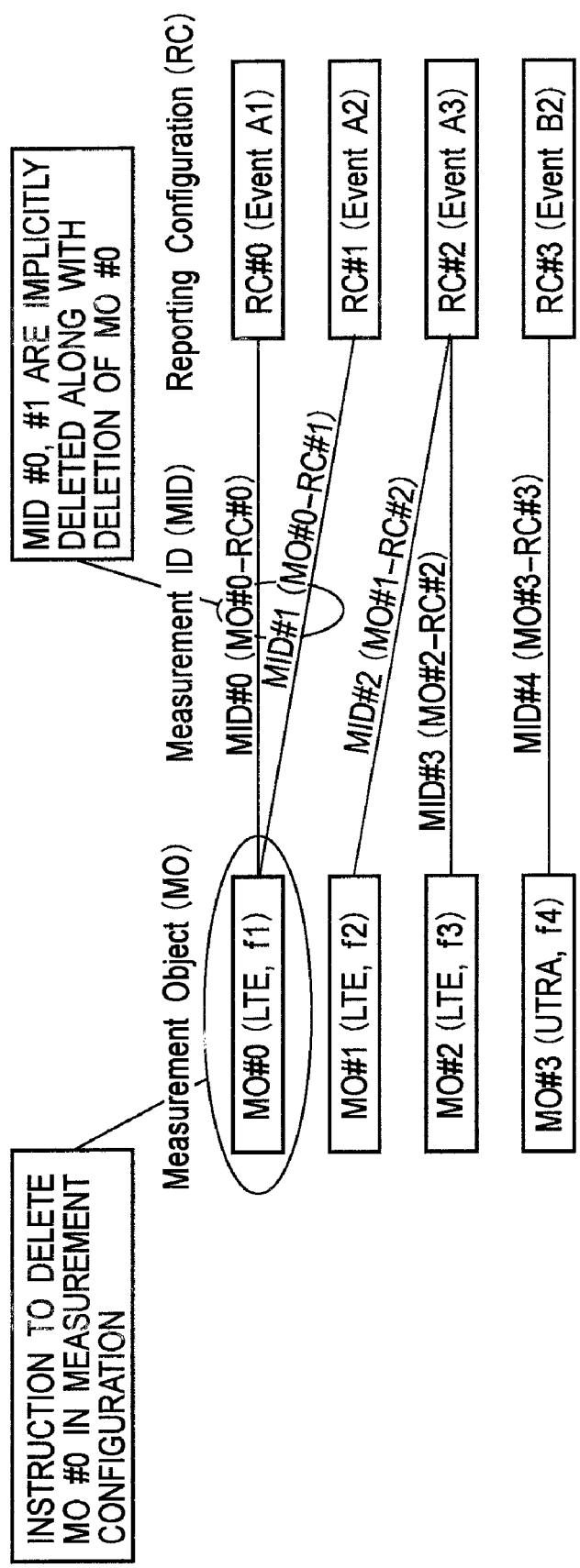
FIG. 16 is a diagram for describing the mobile communication system according to Modification Example 1 of the present invention.
Figure 17:
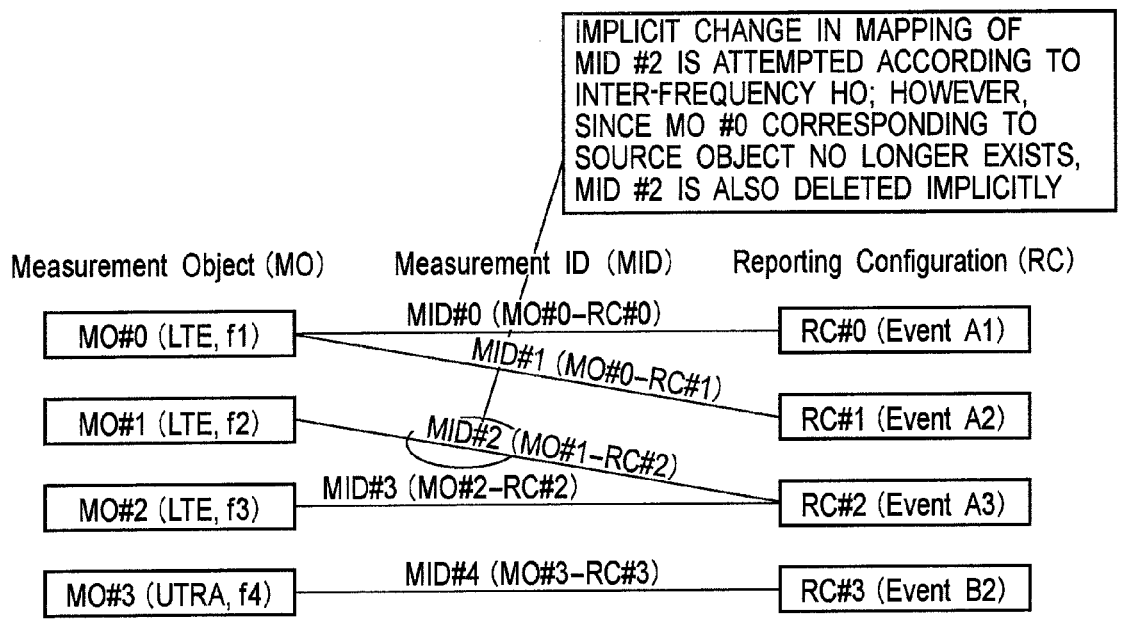
FIG. 17 is a diagram for describing the mobile communication system according to Modification Example 1 of the present invention.

Here, with reference to FIGS. 16 and 17, consider a case where the measurement information storage unit 13 performs the aforementioned swapping after making a change with respect to the aforementioned the measurement information storage unit 13 from the state shown in FIG. 12.

As shown in FIG. 16, firstly, the measurement information storage unit 13 deletes the identification information (MO #0) of the measurement object on the basis of the aforementioned "measurementConfiguration", and then deletes the association information (MID #0/MID #1) including the identification information of the measurement object.

Secondly, the measurement information storage unit 13 attempts the aforementioned swapping, i.e., the swapping of the identification information of the measurement objects (swapping of the MO #0 and the MO #1), or the swapping of the identification information of the measurement objects in the association information (swapping of the MO #0 and the MO #1 in MID #0/MID #1/MID #2), but fails, because the "MO #0" and the "MO #0/MO #1" are deleted (refer to FIG. 17).

As a result, the measurement information storage unit 13 turns into a state where the measurement object for the cell currently in communication is not managed, so that the measurement information storage unit 13 is unacceptable according to the 3GPP standard.

Figure 18:
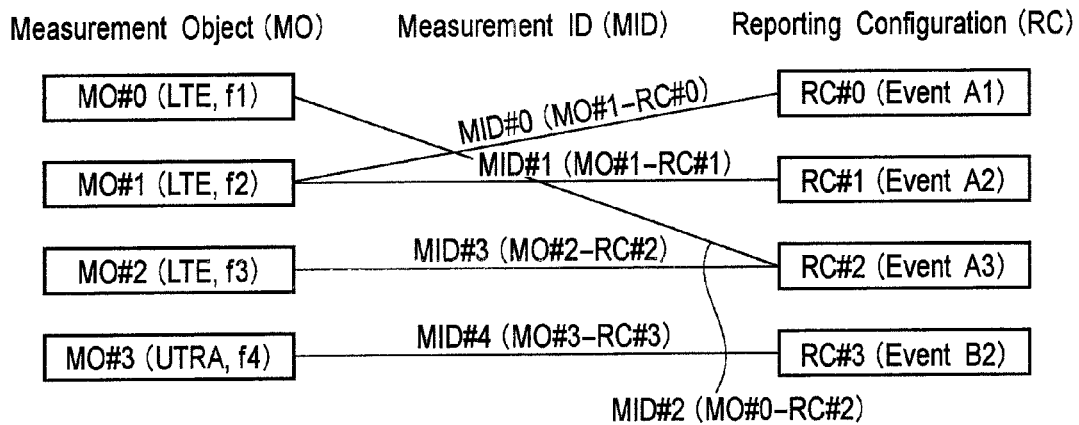
FIG. 18 is a diagram for describing the mobile communication system according to Modification Example 1 of the present invention.
Figure 19:
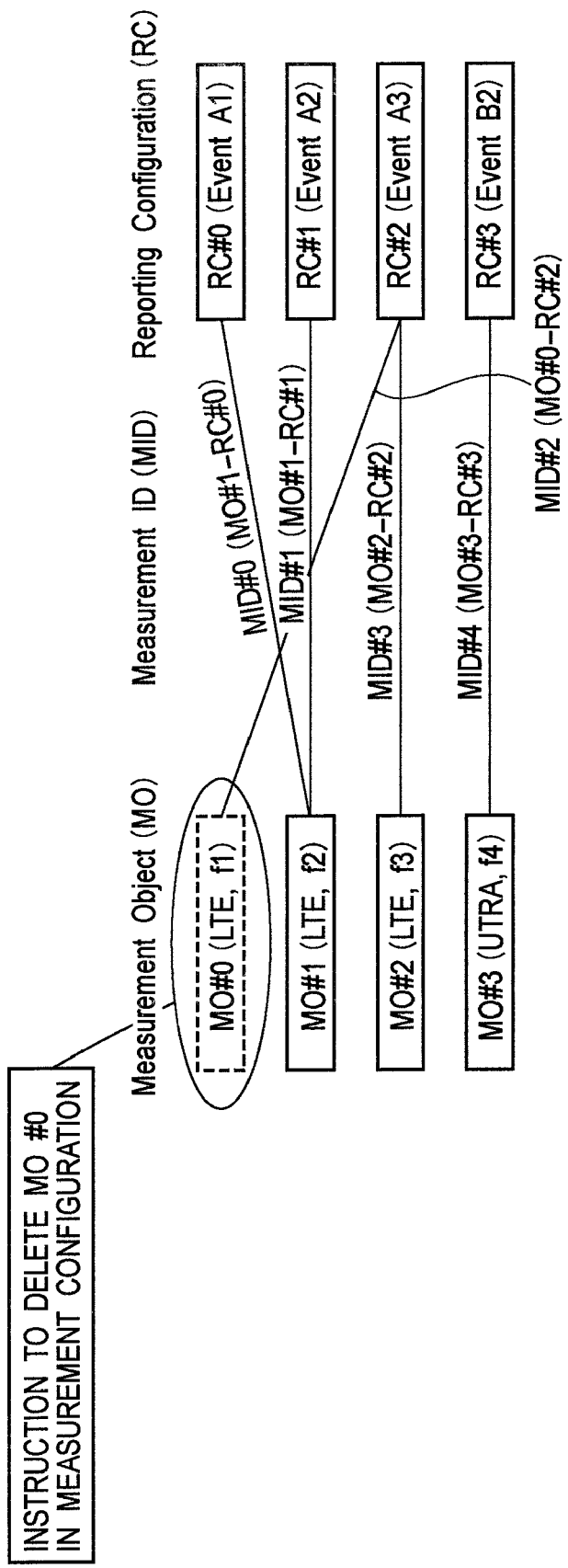
FIG. 19 is a diagram for describing the mobile communication system according to Modification Example 1 of the present invention.

In contrast, with reference to FIGS. 18 and 19, consider a case where the measurement information storage unit 13 makes a change with respect to the aforementioned the measurement information storage unit 13 after performing the aforementioned swapping from the state shown in FIG. 12.

As shown in FIG. 18, firstly, the measurement information storage unit 13 performs the aforementioned swapping on the basis of the aforementioned "measurementControlInformation", i.e., the swapping of the identification information of the measurement objects (swapping of the MO #0 and the MO #1), or swapping of the identification information of the measurement objects in the association information (swapping of the MO #0 and the MO #1 in the MID #0/MID #1/MID #2).

Secondly, the measurement information storage unit 13 deletes the identification information (MO #0) of the measurement object (LTE/f1) corresponding to the cell of the handover source on the basis of the aforementioned "measurementConfiguration", and then deletes the association information (MID #2) including the identification information of the measurement object.

As a result, the measurement information storage unit 13 can achieve both of the swapping based on the aforementioned "mobilityControlInformation" and the change in the measurement information storage unit 13 based on the "measurementConfiguration".

There exist three types of the aforementioned determination conditions, which are an "Event triggered" type, a "Periodical" type and an "Event triggered Periodical" type.

For example, in a case where the determination condition of the "Event triggered" type or the "Event triggered Periodical" type of is set, the Measurement Report transmitter unit 15 is configured to transmit a measurement report, when a predetermined condition is satisfied continuously for a predetermined period (Time-to-trigger).

In addition, in a case where the determination condition of the "Event triggered Periodical" type is set, the Measurement Report transmitter unit 15 is configured to transmit a measurement report once, and thereafter to repeat transmission of the measurement report in a constant cycle until a specific condition is satisfied (until N times of transmission, for example).

Here, in a case where the determination condition is of the "Event triggered" type or of the "Event triggered Periodical" type, the Measurement Report transmitter unit 15 may reset the event (instance of the measurement report) at the time of handovers (inter-frequency handover and same frequency handover). Here, the event is triggered in accordance with the measurement rule associated with the measurement object corresponding to the cell of the handover destination.

Note that, in a case where the determination condition is of the "Periodical" type, the Measurement Report transmitter unit 15 may continue transmission of the measurement report even after the handover is performed.

Note that, the aforementioned operations of the mobile station UE and the radio base station eNB may be executed by hardware or a software module executed by a processor or the combination of both.

The software module may be provided in an optional form of a recording medium such as a RAM (Random. Access Memory), a flash memory, a ROM (Read Only Memory), an EPROM (Erasable Programmable ROM), an EEPROM (Electronically Erasable and Programmable ROM), a register, a hard disk, a removable disk or a CD-ROM.

The aforementioned recording medium is connected to the processor so as to allow the processor to read and write information from and to the recording medium. Moreover, the recording medium may be integrated into the processor. Further, the aforementioned recording medium and the processor may be provided in an ASIC. The ASIC may be provided in the mobile station UE and the radio base station eNB. In addition, the aforementioned recording medium and the processor may be provided in the mobile station UE and the radio base station eNB as a discrete component.

The present invention has been described above by using the aforementioned embodiment. However, it is obvious to those skilled in the art that the present invention is not limited to the embodiment described in this description. The present invention can be implemented as a revised and modified form without departing from the spirit and scope of the present invention, which are defined by the appended claims. Thus, the contents of this description aim to describe the exemplification and not to impose any limitation on the present invention.

Note that, the entire contents of Japanese Patent Application No. 2008-243402 (filed on Sep. 22, 2008) are incorporated in this description by reference.

Industrial Applicability

As described above, according to the present invention, it is possible to provide a mobile station and a mobile communication method capable of flexibly changing a determination condition for determining whether or not to transmit a measurement report by a mobile station UE.

The invention claimed is:

1. A mobile station comprising:
   a measurement information storage unit configured to store identification information of a measurement rule, identification information of a measurement object and association information for associating the identification information of the measurement rule with the identification information of the measurement object;
   a measurement unit configured to perform a measurement of a radio quality in a cell using a frequency defined by the identification information of the measurement object stored in the measurement information storage unit;
   a measurement report transmitter unit configured to transmit a measurement report to a radio base station, when determining that a determination condition defined by the identification information of the measurement rule associated with the identification information of the measurement object is satisfied on the basis of the measurement result of the radio quality; and
   a handover processor unit configured to perform an inter-frequency handover in response to an instruction from the radio base station, wherein
   when the inter-frequency handover is performed, the measurement information storage unit is configured to change an association between identification information of a first measurement object corresponding to a cell currently in communication and first association information, to an association between identification information of a second measurement object corresponding to a handover destination cell and the first association information; and to change an association between identification information of the second measurement object and second association information, to an association between identification information of the first measurement object and the second association information.

2. The mobile station according to claim 1, wherein
   the measurement information storage unit is configured to change a storage content in the measurement information storage unit after performing the change of the association, when the instruction from the radio base station instructs a change in the storage content in the measurement information storage unit in addition to the execution of the inter-frequency handover.

3. A mobile communication method comprising the steps of:
   (A) transmitting, from a radio base station to a mobile station configured to store identification information of a measurement rule, identification information of a measurement object and association information for associating the identification information of the measurement rule with the identification information of the measurement object, a measurement rule specifying command that specifies addition or deletion of the measurement rule, and a measurement object specifying command that specifies addition or deletion of the measurement object;
   (B) measuring, at the mobile station, a radio quality in a cell using a frequency defined by the stored identification information of the measurement object;
   (C) transmitting, from the mobile station to the radio base station, a measurement report, when the mobile station determines that a determination condition defined by the identification information of the measurement rule associated with the identification information of the measurement object is satisfied on the basis of the measurement result of the radio quality;
   (D) determining, at the radio base station, whether or not the mobile station is to perform an inter-frequency handover on the basis of the measurement report; and
   (E) changing, at the mobile station, an association between identification information of a first measurement object corresponding to a cell currently in communication and first association information to an association between identification information of a second measurement object corresponding to a handover destination cell and the first association information; and an association between identification information of the second measurement object and second association information to an association between identification information of the first measurement object and the second association information, when the mobile station performs the inter-frequency handover in response to an instruction from the radio base station.

4. The mobile communication method according to claims 3, wherein
   in the step (E), the mobile station changes a storage content in the mobile station after performing the change of the association, when the instruction from the radio base station instructs a change in the storage content in the mobile station in addition to the execution of the inter-frequency handover.

* * * * *